United States Patent [19]

Gryn

[11] 4,297,895
[45] Nov. 3, 1981

[54] FIELD REPLACEABLE ELECTRODE ASSEMBLY FOR MAGNETIC FLOWMETER

[75] Inventor: Felix J. Gryn, Hatfield, Pa.

[73] Assignee: Emerson Electric Co., St. Louis, Mo.

[21] Appl. No.: 65,167

[22] Filed: Aug. 9, 1979

[51] Int. Cl.³ .............................................. G01F 1/58
[52] U.S. Cl. .............................................. 73/861.12
[58] Field of Search .......... 73/861.12, 861.13, 861.14, 73/861.15, 861.16; 310/11; 324/207

[56] References Cited

U.S. PATENT DOCUMENTS

| | | | |
|---|---|---|---|
| 3,358,075 | 12/1967 | Hunt | 73/861.12 |
| 3,771,361 | 11/1973 | Reznick | 73/861.12 |
| 3,924,466 | 12/1975 | Medlar | 73/861.12 |
| 4,079,626 | 3/1978 | Gardner | 73/861.12 |

FOREIGN PATENT DOCUMENTS 1220160  6/1966  Fed. Rep. of Germany ... 73/861.16

Primary Examiner—Herbert Goldstein
Attorney, Agent, or Firm—Polster, Polster and Lucchesi

[57] ABSTRACT

A field replaceable electrode assembly for a magnetic flowmeter or the like in which an electrode may be readily installed in and sealed relative to a fitting provided on a meter body from the exterior of the meter body.

6 Claims, 3 Drawing Figures

U.S. Patent  Nov. 3, 1981  4,297,895

FIELD REPLACEABLE ELECTRODE ASSEMBLY FOR MAGNETIC FLOWMETER

BACKGROUND OF THE INVENTION

This invention relates to an electrode assembly for a magnetic flowmeter or the like, and in particular to such an electrode assembly in which the electrode can be positively sealed in place and in which the electrode can be readily removed and replaced from the exterior of the meter body.

Typically, a magnetic flowmeter includes a meter body adapted to be connected in a flow pipe, the flow through which is to be measured. Magnetic coils are mounted on the meter body and are excited so as to generate a suitable magnetic field across the body. Two meter electrode assemblies are mounted on opposite sides of the body for sensing the voltage induced in a conductive fluid flowing through the magnetic field within the meter body. The voltage is proportional to flow and is suitably amplified to produce a signal indicative of flow.

Each electrode assembly typically includes an electrode and means for mounting the electrode through the meter body into contact with a conductive fluid in the meter body. Because the meter body is typically made of an electrically conductive material, the electrode is electrically insulated from the meter body. Generally, a liner of non-conductive material is provided in the meter body and a sleeve of non-conductive material is provided around the electrode. The liner may be rigid or compliant, and may be made of a number of materials, such as polytetrafluoroethylene, polyurethane, butyl rubber, or ceramics. In some designs, the liner does not line the entire flow passage through the meter body, but consists of coated areas in the region of the electrodes. Such a construction is shown in U.S. Pat. No. 3,194,068, to Mannherz et al., for example. Regardless of the type of liner, however, it is essential that the electrode be positively sealed relative to the meter body.

In some electrode assemblies, such as is shown in U.S. Pat. No. 3,194,068, the electrode has at its inner end a head or skirt part which bears against the liner replacement of the electrode require that the electrode be removed from the interior of the meter body. This necessitates that the meter body be disconnected from the flow pipe system.

In other known electrode assemblies, complicated and expensive constructions were utilized to sealably hold the electrode in place on the meter body and to permit the installation of the electrode from the exterior of the meter body. In U.S. Pat. No. 3,171,990, for example, expansion of a sleeve by a conical electrode is relied upon to seal the electrode.

Sealing the electrode is more difficult with some liner materials than others. When the liner material is polytetrafluoroethylene, it has been found essential to provide a skirt on the inner end of the electrode to provide an adequate seal, and the electrodes have not, heretofore, been removable from outside the meter body.

In certain applications, for example, when measuring sewage flow, the exposed faces of the electrodes must be repeatedly cleaned. To clean the electrode while in place in the meter body, ultrasonic cleaning techniques have been used. In one known version of an electrode adapted to be ultrasonically cleaned, shown in U.S. Pat. No. 3,479,873, to Hermanns, an ultrasonic transducer engages the electrode outside of the meter body and excites the entire electrode so as to clean its inner end which is exposed to the fluid flow within the meter body. In another ultrasonically cleaned electrode arrangement shown in U.S. Pat. No. 3,771,361, to Reznick, the ultrasonic transducer is positioned in a blind bore in the electrode, and bears on a relatively thin wall behind the exposed electrode face. Although this latter approach has substantial advantages, it does not permit the electrode to be removed without disassembling the meter from its flow pipe system.

One of the objects of this invention is to provide an electrode assembly for a magnetic flowmeter or the like in which the electrode may be readily changed from the exterior of the meter body (i.e., a field replaceable electrode).

Another object is to provide such an electrode assembly in which the electrode may be readily and positively sealed with respect to its holder.

Another object is to provide an electrode which may be effectively and efficiently cleaned in situ by ultrasonic cleaning apparatus.

Another object is to provide an electrode assembly which may be readily used with meter bodies having various electrical insulation liners or coatings on the inner surfaces thereof.

Another object is to provide an electrode assembly in which the electrode is positively electrically insulated with respect to the meter body.

Another object is to provide an electrode assembly which is of relatively simple and economical construction and yet is able to withstand relatively high operating pressures without leakage.

Other objects will be in part apparent and in part pointed out hereinafter.

SUMMARY OF THE INVENTION

In accordance with this invention briefly stated, an improved electrode assembly for a magnetic flowmeter or the like is provided which is adapted to be sealably installed on or removed from a meter body having an opening therethrough for accommodating the electrode assembly. The electrode assembly comprises a fitting adapted to be sealably secured in the opening through the meter body and to extend outwardly therefrom with the fitting having an axial bore therethrough. The fitting further has an enlarged head on its inner end larger than the opening in the meter body. This head has a lip projecting therefrom for sealably engaging the liner all around the head. The electrode assembly further comprises an electrode adapted to be inserted in and to be removed from the bore of the fitting from the exterior of the meter body, the electrode being held within the bore in a sensing position in which it is in sensing relation with fluid flowing through the meter body. Further, means is provided for sealing the electrode with respect to the fitting.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
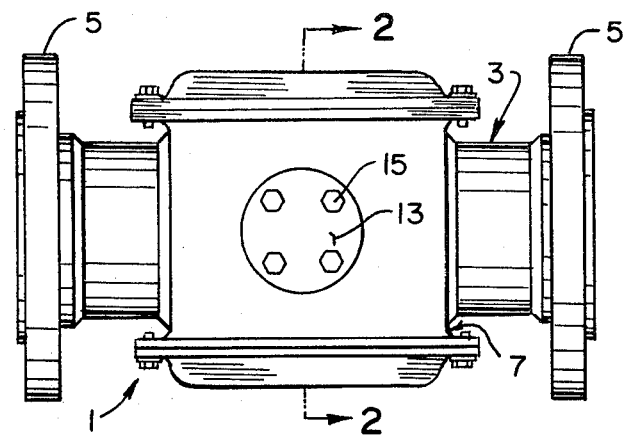
FIG. 1 is a side elevational view of a magnetic flowmeter including the electrode assembly of the present invention.
Figure 2:
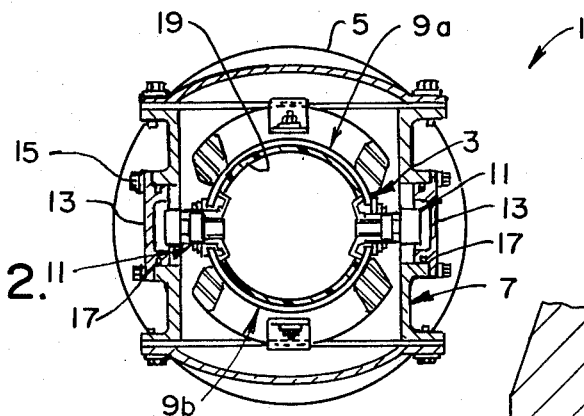
FIG. 2 is a vertical cross sectional view of FIG. 1 taken along line 2—2 illustrating an explosion-proof housing enclosing the magnetic flowmeter on its meter housing, with the magnetic flowmeter being shown to generally include a pair of electro-magnets disposed on opposite sides of the meter body and a pair of electrode assemblies of the present invention diametrically opposed to one another on the meter body between the magnets.

Referring now to the drawings, a magnetic flowmeter of the present invention is indicated in its entirety at 1 and is best shown in FIG. 1. The flowmeter is shown to comprise a meter body 3 which may, for example, be a pipe spool having pipe flanges 5 at each end thereof so as to permit the flowmeter to be readily incorporated (i.e., bolted in place) in a flow pipe system through which flows an electrically conductive fluid whose flow rate is to be measured. As is typical, meter body 3 is free from obstructions to the flow of fluid therethrough and thus does not in any significant way interfere with or disturb the flow of fluid therethrough and it does not constitute any substantial restriction or pressure drop to the flow of fluid therethrough. As indicated at 7 (see FIG. 1), an explosion proof housing at least in part surrounds the meter body and encloses the main components of the magnetic flowmeter. As shown in FIG. 2, housing 7 encloses a pair of coil magnets 9a and 9b which are held in place on opposite sides of the meter body and which are maintained firmly in engagement with the exterior of the meter body or pipe spool. These coils constitute electro-magnets which generate a magnetic field of desired magnetic flux and characteristics within the meter body and in the interior thereof. Preferably, the meter body is made of a selected ferromagnetic material and it serves as a core or return path for the magnetic field generated by the magnets. The magnets may be driven in any number of well known manners which are not per se a part of the present invention and thus are not herein described in detail.

As further shown in FIG. 2, magnetic flowmeter 1 includes a pair of electrode assemblies of the present invention, each of which is generally indicated at 11, with the electrode assemblies being diametrically opposed to one another on opposite sides of the meter body and being essentially located midway between magnets 9a and 9b. Housing 7 is provided a pair of removable cover plates 13, one for each electrode assembly 11, which permit service personnel to access electrode assemblies 11 located immediately behind these cover plates. The cover plates are securely bolted to housing 7 by bolts 15 and are sealed relative thereto by means of O-rings 17, as shown in FIG. 2.

As is further shown in FIG. 2, an electrical insulating liner 19 of suitable electric insulation material is provided on the inside of meter body 3. Liner 19 covers the entire inner surface of the meter body. However, it will be understood that in other magnetic flowmeter designs, it may only be necessary to cover the inside of the meter body proximate the location of electrode assemblies 11. More specifically, insulating liner 19 is preferably a suitable synthetic resin material, such as polytetrafluorethylene sold by DuPont under the registered trademark Teflon. This liner may be bonded or cemented to the inner surface of the pipe spool constituting the meter body in such manner as to prevent the leakage or flow of fluid between the liner and the meter body. Holes or openings 21 (see FIG. 3) are provided in opposite walls of the meter body so as to receive a corresponding electrode assembly 11 of the present invention. A mating opening 23 is provided in liner 19 in register with their respective openings 21 in the walls of the meter body.

Figure 3:
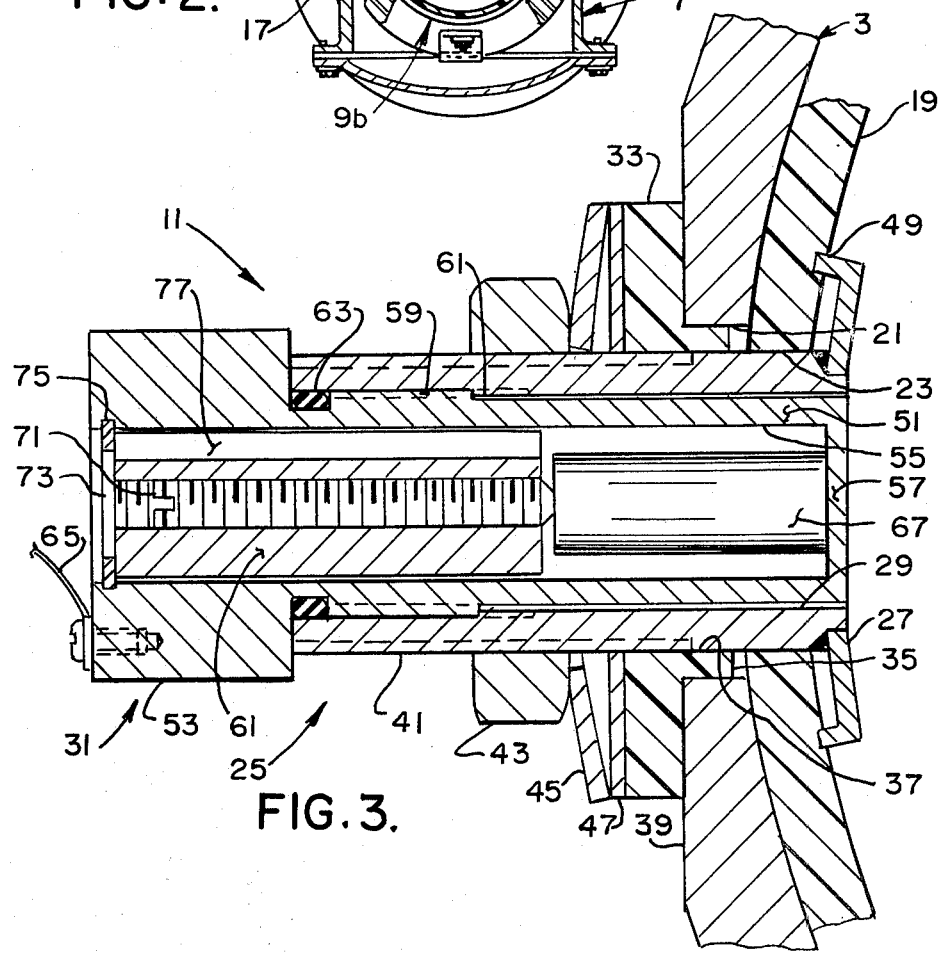
FIG. 3 is an enlarged longitudinal cross-sectional view of the electrode assembly of the present invention.

Generally, an electrode assembly 11 comprises a fitting 25 having an inner head 27 and a bore 29 extending longitudinally therethrough. An electrode, as generally indicated at 31, is received within bore 29 of the fitting with one end of the electrode (i.e., its inner end) being in sensing relation with fluid flowing through the meter body when the electrode is in its installed position (as best shown in FIG. 3). As shown in FIG. 3, head 27 of fitting 25 is appreciably larger than openings 21 and 23 in meter body 3 and liner 19, respectively, and thus the head overlies or covers a portion of the liner surrounding opening 23 therethrough. Head 27 is shaped to fit the curvature of liner 19 and of the meter body proximate opening 21 in the meter body. This is especially desirable in smaller sized flowmeters in which curvature of the meter body is more pronounced. By shaping head 27 to conform to the curvature of the meter body two important results are attained. First, the flow of fluid over the end of the fitting is more uniform and the fitting does not appreciably disturb the flow of fluid through the meter body. Secondly, by shaping the head to the curvature of the meter body, fitting 25 is effectively prevented from rotating about its longitudinal axis relative to the meter body.

Fitting 19 is held centered within its respective opening 23 through the meter body by means of an insulator washer 33. The latter has a lip 35 which is received in opening 23 and a central bore 37 extending longitudinally therethrough for reception of the fitting. Insulator washer 33 is preferably fabricated from a rigid electrical insulation material, such as a fiber reinforced plastic or the like. It will be appreciated that insulator washer 33 electrically insulates fitting 25 and electrode 31 from meter body 3. A respective flat surface 39 is provided on the exterior of the meter body surrounding openings 21 therein. Fitting 25 further has threads 41 on its outer surface. A retaining nut 43 is threaded on the fitting and is engageable with these exterior threads. Further, a flat spring washer 45 (e.g., a Belleville spring washer) is interposed between retainer nut 43 and insulator 33. A flat washer 47 may be placed between the spring washer and insulator washer 33 so as to present a hard bearing surface for the spring washer. Upon tightening retainer nut 43, head 27 of fitting 25 is drawn into leak-tight sealing engagement with liner 19. As noted above, by conforming head 27 to the curvature of the meter body, the head holds the fitting against rotation upon tightening of nut 43 or electrode 31.

In accordance with this invention, head 27 has a continuous sealing surface 49 on its inner face which sealingly engages liner 19 so as to form a positive seal therewith when retaining nut 43 is tightened. In this manner, fitting 25 is positively sealed relative to liner 19.

Electrode 31 is made of suitable electrically conductive material and it has a shank portion 51 and an enlarged outer head 53. A blind bore 55 extends longitudinally through the electrode from head 53 toward its inner closed end 57. As shown, the inner end 57 of the electrode is relatively thin for purposes as will appear. Shank 51 is threaded, as indicated at 59, so as to engage internal thread 61 provided in fitting 25 thereby to secure the electrode in a desired position within the fitting with the inner end of the electrode being positioned for sensing the electrical field or voltage induced in the fluid flowing through meter body 3. A compressible O-ring seal 63 is received in mating grooves which are provided in fitting 25 and shank 51 thereby to seal the electrode to fitting 25. An electrode lead 65 is secured to electrode head 53 and of course this lead is connected to sensing means (not shown) for sensing the presence and magnitude of an electric field in the fluid being measured.

An ultrasonic transducer, as generally indicated at 67, is received within bore 55 of electrode 31 and is directly engageable with the inner face of the inner closed end 57 of the electrode so that upon energization of the ultrasonic transducer, ultrasonic energy is input directly to the portion of the electrode to be cleaned (i.e., its inner end). Transducer 67 is held in place by means of a retainer 69 and set screw 71 threadable carried by the retainer. A removable snap ring 73 which fits in a groove 75 formed within the electrode holds the retainer in place in the electrode bore. As indicated at 77, a slot is provided in the retainer for the passage of leads (not shown) so that the transducer may be energized by means of an ultrasonic generator (also not shown).

Prior to installation of meter body 3 in the piping system whose flow rate is to be measured, fitting 25 of each electrode assembly 11 is inserted through its respective opening 23 in liner 19 and through its respective opening 21 in the wall of the meter body from the inside of the meter body and head 27 is brought into engagement with the liner. Then, insulator washer 33 is inserted in opening 21 so as to surround the fitting and to center the fitting within the opening. Washer 47 is fitted in place on the insulator and spring washer 45 and retaining nut 43 are then installed. The retaining nut is then drawn tight so as to forcefully draw head 27 into sealing engagement with liner 19 and so as to force its sealing rim 49 into biting sealing engagement with the liner. Also, tightening of the retaining nut compresses spring washer 45 thereby to resiliently maintain head 27 in sealing engagement with the liner. The electrode is inserted in bore 29 of fitting 25 and the respective threads 59 and 61 of the electrode and fitting are engaged with one another and the electrode is threaded into the fitting to its sensing position in which its inner end 57 is in position so as to sense the electrical field induced within the fluid flowing through the meter body and in which O-ring 63 is compressed thereby to positively make a seal between fitting 25 and electrode 31.

It will be noted that the electrodes 31 of electrode assembly 11 are readily field replaceable without the necessity of access to the electrode from the interior of meter body 3. In electrode assembly 11, electrode 31 may be replaced by unscrewing the electrode from bore 29 of fitting 25. Upon installation, electrode 31 is merely threaded into the bore of the fitting an as it is tightened, its outer end 57 is brought into sensing relation with fluid flowing through the meter body and its O-ring seal 63 is compressed so as to positively seal the electrode with respect to the fitting.

In view of the above, it will be seen that other objects and features of the invention are achieved and other advantageous results are attained.

As various changes could be made in the above constructions without departing from the scope of the invention, it is intended that all matter contained in the description or shown in the accompanying drawings shall be interpreted as illustrative and not in a limiting sense.

I claim:

1. An electrode assembly for a magnetic flowmeter or the like adapted to be sealably installed on or removed from a meter body or the like, said meter body having a liner on the inside thereof of suitable electrical insulation material and an opening therethrough for accommodating said electrode assembly, said electrode assembly comprising a fitting adapted to be sealably secured to said meter body and to extend outwardly therefrom, said fitting having an axial bore therethrough and an enlarged head on its inner end, said head having a lip projecting therefrom for sealable engagement with said lining all around said head, said lip being so shaped as to conform to the curvature of the portion of the meter body proximate said fitting thereby to prevent rotation of said fitting about its longitudinal axis relative to said meter body, said assembly further comprising spring means for urging said fitting outwardly from said meter body, thereby urging said lip into engagement with said liner, and an electrode adapted to be inserted in and removed from said bore from the exterior of said meter body, said electrode being held within said bore in a sensing position in which it is in sensing relation with fluid flowing through said meter body, and means for sealing said electrode with respect to said fitting.

2. An electrode assembly as set forth in claim 1 wherein said electrode seal means comprises a compressible seal between said electrode and said fitting.

3. An electrode assembly as set forth in claim 2 wherein said electrode is threadably received in said bore of said fitting for securement of said electrode therewithin and for compression of said seal between said electrode and said fitting.

4. An electrode assembly as set forth in claim 1 wherein said electrode has a blind bore therewithin with the bottom of said bore being in close proximity to the interior of said meter body when said electrode assembly is installed on said meter body, ultrasonic means being receivable within said bore for ultrasonically cleaning the end portion of said electrode without removal of the electrode from said meter body.

5. An electrode assembly as set forth in claim 4 wherein said ultrasonic cleaning means comprises an ultrasonic transducer fitted within said bore in ultrasonic excitation relation with the end of said electrode, said ultrasonic transducer remaining in place within said electrode and being selectively energized so as to effect ultrasonic cleaning of said electrode.

6. An electrode assembly as set forth in claim 1 wherein said fitting is externally threaded and wherein said assembly further includes a retaining nut threaded onto said fitting, and wherein said spring means comprises a spring washer between said retainer nut and said meter body.

* * * * *